Feb. 16, 1926.
A. BÖTTNER
GATE VALVE
Filed May 4, 1925
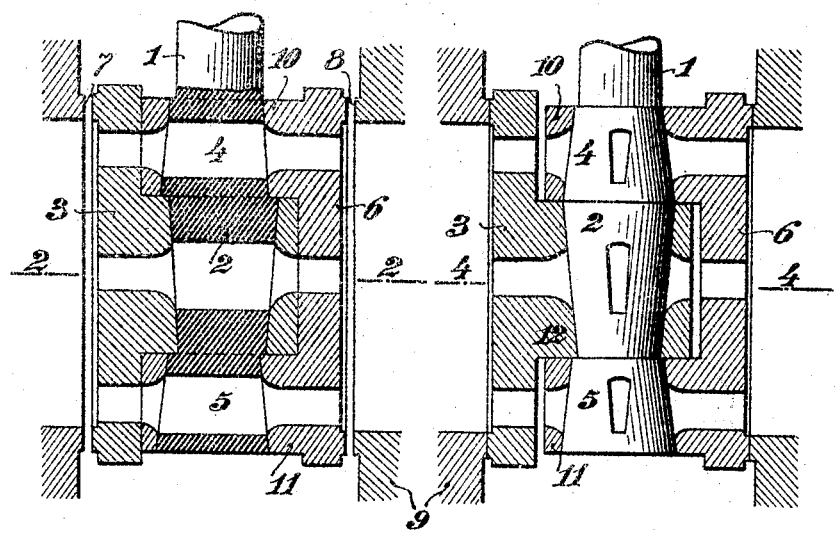
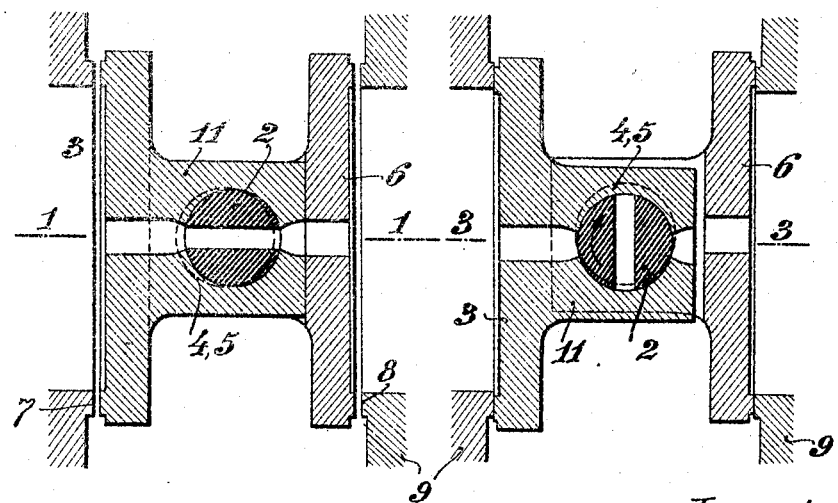
Inventor:
Arno Böttner Patented Feb. 16, 1926.

1,572,984

UNITED STATES PATENT OFFICE.

ARNO BÖTTNER, OF SUDENBURG, NEAR MAGDEBURG, GERMANY, ASSIGNOR TO THE FIRM POLTE, OF MAGDEBURG, GERMANY.

GATE VALVE.

Application filed May 4, 1925. Serial No. 27,920.

*To all whom it may concern:*

Be it known that I, ARNO BÖTTNER, a citizen of the German Republic, residing at No. 58 Helmstedterstrasse, Sudenburg, near Magdeburg, Germany, have invented certain new and useful Improvements in Gate Valves (for which I have filed application for patent in Germany dated July 19, 1923), of which the following is a specification.

My invention pertains to that class of parallel slide stop valves or gate valves for use in steam conduits and the like in which two parallel cut off plates are provided and adapted to be moved up and down for opening and closing purposes.

In my prior Patent No. 1,550,338, filed January 29, 1925, I have disclosed an improved gate-valve of the above stated type and the present invention relates more particularly to a further improvement thereof aiming to provide a valve which is more convenient to manipulate.

With this object in view I construct the eccentric body or bodies enclosed between the cut-off plates so as to be of conical shape and provided with diametral or horizontal bores for the passage of the steam, the arrangement of the parts being such that upon turning the valve spindle in the one direction the plates will be forced against and in contact with the opposite sealing faces in order to close the valve, while upon turning the spindle in opposite direction the plates will be withdrawn from the said faces in order to open the valve.

The improved construction above indicated affords the advantage of a more ready movability of the valve for closing and opening purposes and of a quick passage of the steam therethrough so that the valve will be balanced more readily. Furthermore the conduit section past the valve will be heated by the intruding steam in a more suitable and gradual manner so that heavy jerks and fractures in the conduit are avoided. In most cases it will answer the purpose well if only the inner conical body is provided with a transverse bore or opening for the steam to pass therethrough, while the two outer bodies that is the one on top and the one below the former, may be of cylindrical shape without any bores or passages. The conical portions are for the purpose of providing a tight fit in order to prevent the leakage of the fluid and therefore the conical surfaces are necessary only in the portions which are provided with the bores or passages. Therefore, if only a central passage is provided the portion 2 only need be conical and the portions 4 and 5 may be cylindrical.

The structure embodying the novel features of my invention is hereinafter more fully described and illustrated in the accompanying drawings forming a part of this specification, in which—

Figure 1 is a vertical section of the valve taken on the line 1—1 of Figure 2; Figure 2 is a horizontal section taken on line 2—2 of Figure 1; Figures 3 and 4 are sectional views similar to Figures 1 and 2, respectively, but showing the movable parts of the valve in a different position.

Parts which are repeated in the several figures bear the same reference characters in each case, Figures 1 and 2 showing the valve in open position and Figures 3 and 4 illustrating the same when closed. It is, however, to be noted that in the embodiment shown in the drawings by way of example, for clearness sake only those portions of the casing and the spindle are illustrated which are in contact with the said plates while all of the other portions thereof and the other constituent parts of the valve are not shown as they may be of any conventional type known to persons versed in the art, and may be constructed to operate the valve, for example, in such a manner that the cut-off plates will move up and down with the spindle on turning a co-operating hand wheel in the one or the other direction as explained more in detail in my prior Patent No. 1,550,338.

In the drawings the inner conical body or enlargement 2 on the spindle 1 operates the shutting plate 3 and the conical bodies or enlargements 4 and 5 on the spindle 1 operate the shutting plate 6. The bodies 4 and 5 are displaced, with relation to the body 2, by 90° so that upon turning the spindle the two plates 3 and 6 are moved in opposite directions either towards each other, in case of closing the valve, or away from each other for the opening purpose, as will be clearly understood from an inspection of the drawings.

As soon as, on causing the spindle to move down, as hereinbefore described, the cut-off plates 3 and 6 adopt a position in axial alinement with the casing, a rotary motion will be imparted to the spindle in the usual way whereby also the enlargements 2, 4 and 5 of the spindle are turned 90° so that the parts will have the positions depicted in Figures 3 and 4, that is to say, with the cut-off plates 3 and 6 in closing or closed position and the bores, vents or passages provided in the bodies or enlargements 2, 4 and 5 of the stem, in closed or inactive position as clearly seen in Figure 4.

The bodies or enlargements 2, 4 and 5 are fitted in correspondingly shaped bores of lugs 10, 11 and 12 projecting inward from the plates 3 and 6 in staggered relationship.

In case of opening the valve the actuation and movement of the parts is in inverse order, that is to say, the spindle and the conical bodies or enlargements integral therewith are caused to first rotate 90° from the position shown in Figures 3 and 4 to that illustrated in Figures 1 and 2, so that the bores, vents or passages therein will be discovered and active to allow the fluid to pass therethrough, and then, upon continued actuation of the hand wheel, to rise without turning, so that the cut-off plates 3 and 6 will be moved out of alinement with the casing 9 and the full area of the valve will be free and open.

In the position of the spindle shown in Figures 1 and 2, the rotary movement of the same is terminated and the cut-off plates 3 and 6 are withdrawn from their respective co-operating faces 7 and 8 of the casing 9. In order to fully clear the passage of the valve the spindle 1 and the plates 3 and 6 are then moved upwards with the aid of constructional means and in the manner usual in valves of the class to which the described valve pertains.

In the position of the spindle illustrated in Figures 3 and 4 the same is displaced, with relation to the showing of Figures 1 and 2, owing to a rotation of 90° in the direction of the arrow shown in Figure 4, and the cut-off plates 3 and 6 are in intimate contact with the respectively opposite faces 7 and 8 of the casing 9 so that the valve is completely closed.

It will be evident that my invention while being adhered to in its main essentials, may be varied and adapted in many ways, according to the several requirements desired, or most suitable under different circumstances, without thereby departing from the spirit of the invention or the spirit and scope of the appended claims.

What I claim is:—

1. A device for operating a valve of the character set forth, comprising a casing, two shutting plates adapted to be moved vertically with regard to and in said casing, a spindle connected with the said plates for moving the same, eccentrical enlargements at the lower end of the said spindle one of which is of conical shape, and lugs with bores projecting inward from the said plates for the reception of the said enlargements, substantially as and for the purpose set forth.

2. A device for operating a valve of the character set forth, comprising a casing, two shutting plates adapted to be moved vertically with regard to and in said casing, a spindle connected with the said plates for moving the same, superposed eccentrical enlargements of conical shape at the lower end of said spindle, and lugs with bores projecting inward from the said plates for the accommodation of the said enlargements, substantially as and for the purpose set forth.

3. A device for operating a valve of the character set forth, comprising a casing, two shutting plates adapted to be moved vertically in respect to and in said casing, a spindle connected with the said plates for moving the same, eccentrical enlargements at the lower end of the said spindle one of which is of conical shape, a transverse bore or passage in the said conical enlargement, and lugs with bores projecting inward from the said plates for the accommodation of the said enlargements, substantially as and for the purpose set forth.

4. A device for operating a valve and for the purpose and character set forth, comprising a casing, two shutting plates adapted to be moved vertically in respect to and in said casing, a spindle connected with the said two plates for moving the same, superposed eccentrical enlargements of conical shape at the lower end of said spindle, transverse bores or passages in the said conical enlargements, and lugs with bores projecting inward from the said plates for the reception of the said enlargements, substantially as and for the purpose set forth.

5. A device for operating a valve comprising a casing; a pair of shutting plates in said casing each provided with a lateral projection and a passage; and a spindle having a pair of eccentrics thereon at least one of which has a conical shape and each of which is adapted to operate one of said shutting plates by means of its lateral projection in order to impart a lateral movement to said plates when said spindle is actuated, said spindle having a passage therein through the conical section, which is adapted to cooperate with the passage in the plates in order to allow a partial passage for the fluid.

6. A device for operating a valve comprising a casing; a pair of shutting plates in said casing each provided with a lateral projection and passages; and a spindle having conical eccentrics therein, each being adapted to operate one of said shutting plates by means of its lateral projection in order to impart a lateral movement to said plates when said spindle is actuated, said spindle having passages therein which are adapted to cooperate with the passages in the plates in order to allow a partial passage for the fluid.

In testimony whereof I affix my signature.

ARNO BÖTTNER.